(12) United States Patent
Kim (10) Patent No.: US 10,723,339 B2
(45) Date of Patent: Jul. 28, 2020

(54) VALVE BLOCK FOR ELECTRONIC CONTROL BRAKE SYSTEM

(71) Applicant: MANDO CORPORATION, Gyeonggi-do (KR)

(72) Inventor: Eunmi Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 44 days.

(21) Appl. No.: 15/968,648

(22) Filed: May 1, 2018

(65) Prior Publication Data

US 2018/0326962 A1     Nov. 15, 2018

(30) Foreign Application Priority Data

May 11, 2017   (KR) .......................... 10-2017-0058589

(51) Int. Cl.
*B60T 15/02* (2006.01)
*B60T 13/68* (2006.01)
(Continued)

(52) U.S. Cl.
CPC ............ *B60T 15/028* (2013.01); *B60T 8/368* (2013.01); *B60T 8/4068* (2013.01);
(Continued)

(58) Field of Classification Search
CPC ..... Y10T 137/87885; Y10T 137/85986; B60T 17/06; B60T 8/17; B60T 8/366;
(Continued)

(56) References Cited

U.S. PATENT DOCUMENTS 6,390,133 B1 *   5/2002   Patterson .............. B60T 8/3615
                                                    138/30
9,073,526 B2 *   7/2015   Kodama ................. B60T 8/368
(Continued)

FOREIGN PATENT DOCUMENTS

JP      2001-124005        5/2001
KR    10-2011-0014204      2/2011
(Continued)

OTHER PUBLICATIONS

Office Action dated Dec. 14, 2018 for Korean Patent Application No. 10-2017-0058589 and its English translation by Global Dossier.
(Continued)

*Primary Examiner* — Jessica Cahill
(74) *Attorney, Agent, or Firm* — Ladas & Parry, LLP (57) ABSTRACT

A valve block for an electronic brake system is disclosed. The valve block is configured to have two hydraulic circuits, a plurality of accommodating bores in which valves, pumps, low pressure accumulators, pressure sensors, and a motor are installed in order to control the braking hydraulic pressure supplied from a master cylinder to a wheel cylinder installed in each wheel, and a plurality of flow passages for connecting the plurality of accommodating bores, wherein on opposite side surfaces of the valve block, pump accommodating bores are formed symmetrically to each other to accommodate the pump, and first damping bores having an arrangement parallel to the pump accommodating bores are formed above the pump accommodating bores, wherein on an upper surface of the valve block, a pair of second damping bores is formed so as to be positioned above the first damping bores, and wherein first hydraulic lines are formed in a straight line from a bottom surface of the pair of second damping bores toward a bottom surface of the valve block, so that a discharge side of the pump accommodating bores and a suction side of the first damping bores, and a
(Continued)

discharge side of the second damping bores and the bottom surface of the second damping bores are connected by the first hydraulic lines.

19 Claims, 7 Drawing Sheets

(51) Int. Cl.
    *B60T 8/40*     (2006.01)
    *B60T 8/36*     (2006.01)
    *B60T 8/48*     (2006.01)
    *B60T 8/34*     (2006.01)

(52) U.S. Cl.
    CPC .......... *B60T 8/4872* (2013.01); *B60T 13/686* (2013.01); *B60T 8/341* (2013.01); *B60T 2270/10* (2013.01); *B60T 2270/203* (2013.01)

(58) Field of Classification Search
    CPC ...... B60T 8/368; B60T 8/3675; B60T 8/4068; B60T 8/4872; B60T 8/341; B60T 15/028
    See application file for complete search history.

(56) References Cited

U.S. PATENT DOCUMENTS

| | | | | |
|---|---|---|---|---|
| 9,428,165 | B1* | 8/2016 | Kim | B60T 8/368 |
| 2002/0102168 | A1* | 8/2002 | Gegalski | B60T 8/368 417/415 |
| 2002/0149259 | A1* | 10/2002 | Otomo | B60T 8/367 303/3 |
| 2006/0220768 | A1* | 10/2006 | Iyatani | B60T 8/368 335/78 |
| 2010/0207446 | A1* | 8/2010 | Tandler | B60T 8/368 303/10 |
| 2011/0036434 | A1* | 2/2011 | Fischbach-Borazio | B60T 8/368 137/861 |
| 2012/0139331 | A1* | 6/2012 | Terashima | B60T 8/368 303/10 |
| 2013/0319562 | A1* | 12/2013 | Weh | F15B 13/0803 137/884 |
| 2015/0298675 | A1* | 10/2015 | Mayr | B60T 8/368 92/169.1 |
| 2016/0107626 | A1* | 4/2016 | Jeon | B60T 13/686 303/15 |

FOREIGN PATENT DOCUMENTS

| | | |
|---|---|---|
| KR | 10-2014-0107326 | 9/2014 |
| KR | 10-2015-0071316 | 6/2015 |
| KR | 10-2015-0087895 | 7/2015 |

OTHER PUBLICATIONS

Office Action dated Jun. 15, 2018 for Korean Patent Application No. 10-2017-0058589 and its English machine translation by Google Translate.

* cited by examiner

FIG. 7

VALVE BLOCK FOR ELECTRONIC CONTROL BRAKE SYSTEM

CROSS-REFERENCE TO RELATED APPLICATION(S)

This application is based on and claims priority under 35 U.S.C. § 119 to Korean Patent Application No. 10-2017-0058589, filed on May 11, 2017 in the Korean Intellectual Property Office, the disclosure of which is incorporated by reference herein in its entirety.

BACKGROUND

1. Technical Field

The present disclosure relates to a valve block, more particularly to a valve block for an electronic brake system for electronically controlling braking pressure in a hydraulic brake system.

2. Description of the Related Art

An electronic brake system, which is for effectively preventing a slip phenomenon that may occur during braking, sudden acceleration, or rapid acceleration of a vehicle, typically includes a booster device, a master cylinder, and a wheel cylinder of a vehicle brake system, as well as a valve block for regulating the braking hydraulic pressure and an electronic control unit for controlling the valve block.

A plurality of solenoid valves (NO/NC valves) for controlling the braking hydraulic pressure transmitted to the wheel cylinder side provided in each wheel, a low pressure accumulator for temporarily storing the oil that has exited from the wheel cylinder, a pair of pumps driven by a motor, a shuttle valve, a driving force control valve, and the like which are respectively provided at a suction portion and a discharge portion of the pumps are installed in the valve block of a rectangular parallelepiped shape made of aluminum.

In order to install a large number of components compactly, valve accommodating bores, pump accommodating bores and a motor accommodating bore, low pressure accumulator accommodating bores, connection ports connected with the master cylinder and the wheel cylinder, and pressure sensor accommodating bores for the measurement of pressure are machined in such valve block.

In recent years, as additional functions required in the electronic brake system are increased, a pair of wheel pressure sensors for measuring the hydraulic pressure in the wheel cylinder, and a pulsation reduction device selectively connected to the discharge port side of the pump in order to reduce the pressure pulsation of the oil pressurized and discharged by the operation of the pump are mounted on the valve block, in addition to a cylinder pressure sensor for measuring the hydraulic pressure generated from the master cylinder.

Further, in order to more effectively reduce the pressure pulsation of the oil, an additional damping device is mounted on the valve block in addition to the pulsation reduction device.

However, the conventional valve block has a problem in that an unused space other than a space in which a plurality of components is arranged is unnecessarily present thereby to require improvement in the arrangement structure of the components.

Further, the conventional valve block has a problem that because the flow passage structure in the valve block is changed when the pulsation reduction device is formed in the valve block, compatibility between the valve block provided with the pulsation reduction device and the valve block without the pulsation reduction device is difficult.

Further, the conventional valve block has a problem that because the size of the valve block is increased when an additional damping device is installed together with the pulsation reduction device, it is difficult to install the valve block in a vehicle. That is, although the internal structure of the valve block must be compact in order to reduce the weight and size of the valve block, the conventional valve block has a problem in that the size of the valve block is increased due to the addition of additional components and the change of the flow passages, and thus the management cost is increased.

SUMMARY

It is an aspect of the present disclosure to provide a valve block for an electronic brake system capable of optimizing the size of the valve block by utilizing unused space in the valve block.

Further, it is an aspect of the present disclosure to provide a valve block for an electronic brake system capable of improving compatibility without changing the size of the valve block by allowing the same flow passages to be implemented irrespective of the presence or absence of a pulsation reduction device and the installation of an additional damping device.

Further, it is an aspect of the present disclosure to provide a valve block for an electronic brake system capable of reducing the machining time of accommodating bores for installing wheel pressure sensors and improving the ease of machining by installing the wheel pressure sensors using flow passages formed in the valve block.

Additional aspects of the present disclosure will be set forth in part in the description which follows and, in part, will be obvious from the description, or may be learned by practice of the disclosure.

In accordance with one aspect of the present disclosure, there may be a valve block for an electronic brake system which is configured to have two hydraulic circuits, a plurality of accommodating bores in which valves, pumps, low pressure accumulators, pressure sensors, and a motor are installed in order to control the braking hydraulic pressure supplied from a master cylinder to a wheel cylinder installed in each wheel, and a plurality of flow passages for connecting the plurality of accommodating bores, wherein on opposite side surfaces of the valve block, pump accommodating bores are formed symmetrically to each other to accommodate the pump, and first damping bores having an arrangement parallel to the pump accommodating bores are formed above the pump accommodating bores, wherein on an upper surface of the valve block, a pair of second damping bores is formed so as to be positioned above the first damping bores, and wherein first hydraulic lines are formed in a straight line from a bottom surface of the pair of second damping bores toward a bottom surface of the valve block, so that a discharge side of the pump accommodating bores and a suction side of the first damping bores, and a discharge side of the second damping bores and the bottom surface of the second damping bores are connected by the first hydraulic lines.

Further, on the opposite side surfaces of the valve block, orifice bores may be formed symmetrically with each other so as to have an arrangement parallel to the first damping bores between the first damping bores and the second damping bores.

Further, the respective orifice bores may be directly connected to the respective first hydraulic lines.

Further, on a rear surface of the valve block, second hydraulic lines perpendicular to the first hydraulic lines may be formed so that the respective first hydraulic lines and the respective orifice bores are connected.

Further, the valve block for an electronic brake system may further comprise closing members to close the second hydraulic lines formed on the rear surface of the valve block from the outside, wherein as the respective second hydraulic lines are closed from the outside by the respective closing members, the respective second hydraulic lines that connect the respective first hydraulic lines which are formed between the respective first damping bores and the respective second damping bores, and the respective orifice bores are formed by third hydraulic lines having a T shape.

Further, accommodating bores in which NO valves, NC valves, driving force control valves, shuttle valves, and pressure sensors are installed may be formed on a front surface of the valve block, receiving bores in which a motor and a motor connector are installed and master cylinder connection ports connected to the master cylinder may be formed on a rear surface of the valve block, a pair of low pressure accumulator accommodating bores may be formed on a lower surface of the valve block, and wheel cylinder connection ports may be formed on the upper surface of the valve block.

Further, a plurality of NO valve accommodating bores for accommodating the respective NO valves may be arranged in a first valve row and a plurality of NC valve accommodating bores for accommodating the respective NC valves may be arranged in a second valve row on the front surface of the valve block, a pair of driving force control valve accommodating bores may be formed above the first valve row so as to have an arrangement parallel to the first valve row, and a pair of shuttle valve accommodating bores may be formed between the first valve row and the second valve row so as to have an arrangement parallel to the first and second valve rows.

Further, a motor accommodating bore may be arranged between the pair of pump accommodating bores, and a motor connector accommodating bore may be arranged above the motor accommodating bore, and the motor accommodating bore and the motor connector accommodating bore may be arranged on a center line based on the center line across the upper and lower surfaces of the valve block.

Further, leakage bores may be further formed so as to be arranged between the pair of low pressure accumulator accommodating bores.

Further, the leakage bores may be formed on the rear surface of the valve block.

Further, the master cylinder connection ports may be arranged in a pair so as to be respectively provided in the two hydraulic circuits and may be arranged close to the upper surface of the valve block, and the second damping bores may be formed between the pair of master cylinder connection ports and each side surface of the valve block.

Further, the pump accommodating bores may be formed to be disposed between the first valve row and the second valve row.

Further, the first damping bores may be formed between the first valve row and a valve row in which the pair of driving force control valves is formed.

Further, pressure sensor accommodating bores in which the pressure sensors are installed may be formed on the front surface of the valve block, and may include a cylinder pressure sensor accommodating bore to detect the hydraulic pressure of the master cylinder and wheel pressure sensor accommodating bores to detect the hydraulic pressure of the wheel cylinders.

Further, the cylinder pressure sensor accommodating bore may be formed on a center line based on the center line dividing the two hydraulic circuits to be connected through a flow passage to any one of the pair of cylinder connection ports connected to the master cylinder and, may be formed above the pair of driving force control valve accommodating bores.

Further, the wheel pressure sensor accommodating bores may be respectively provided in the two hydraulic circuits and may be formed between the first valve row and the pair of driving force control valve accommodating bores.

Further, the wheel pressure sensor accommodating bores may be formed to be connected to port connection flow passages connecting the wheel cylinder connection ports and the NO valve accommodating bores.

Further, the orifice bores may be formed on both sides of the valve block so as to be parallel to a valve row in which a pair of driving force control valve accommodating bores is formed, and the outlets of the orifice bores may be connected to the driving force control valve accommodating bores.

In accordance with another aspect of the present disclosure, there may be a valve block for an electronic brake system which is configured to have two hydraulic circuits, a plurality of accommodating bores in which valves, pumps, low pressure accumulators, pressure sensors, and a motor are installed in order to control the braking hydraulic pressure supplied from a master cylinder to a wheel cylinder installed in each wheel, and a plurality of flow passages for connecting the plurality of accommodating bores, wherein a motor accommodating bore in which the motor is installed is formed on one side surface of the valve block, and at least one motor vent hole is formed in the motor accommodating bore.

Further, the motor accommodating bore and the motor vent hole may be arranged on a center line based on the center line across an upper surface and a lower surface of the valve block, and on one surface of the valve block, a leakage bore may be formed to abut the motor vent hole at the center line.

BRIEF DESCRIPTION OF THE DRAWINGS

The present disclosure will be described in detail with reference to the following drawings, which illustrate preferred embodiments of the present disclosure, and thus the technical idea of the present disclosure should not be construed as being limited thereto.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
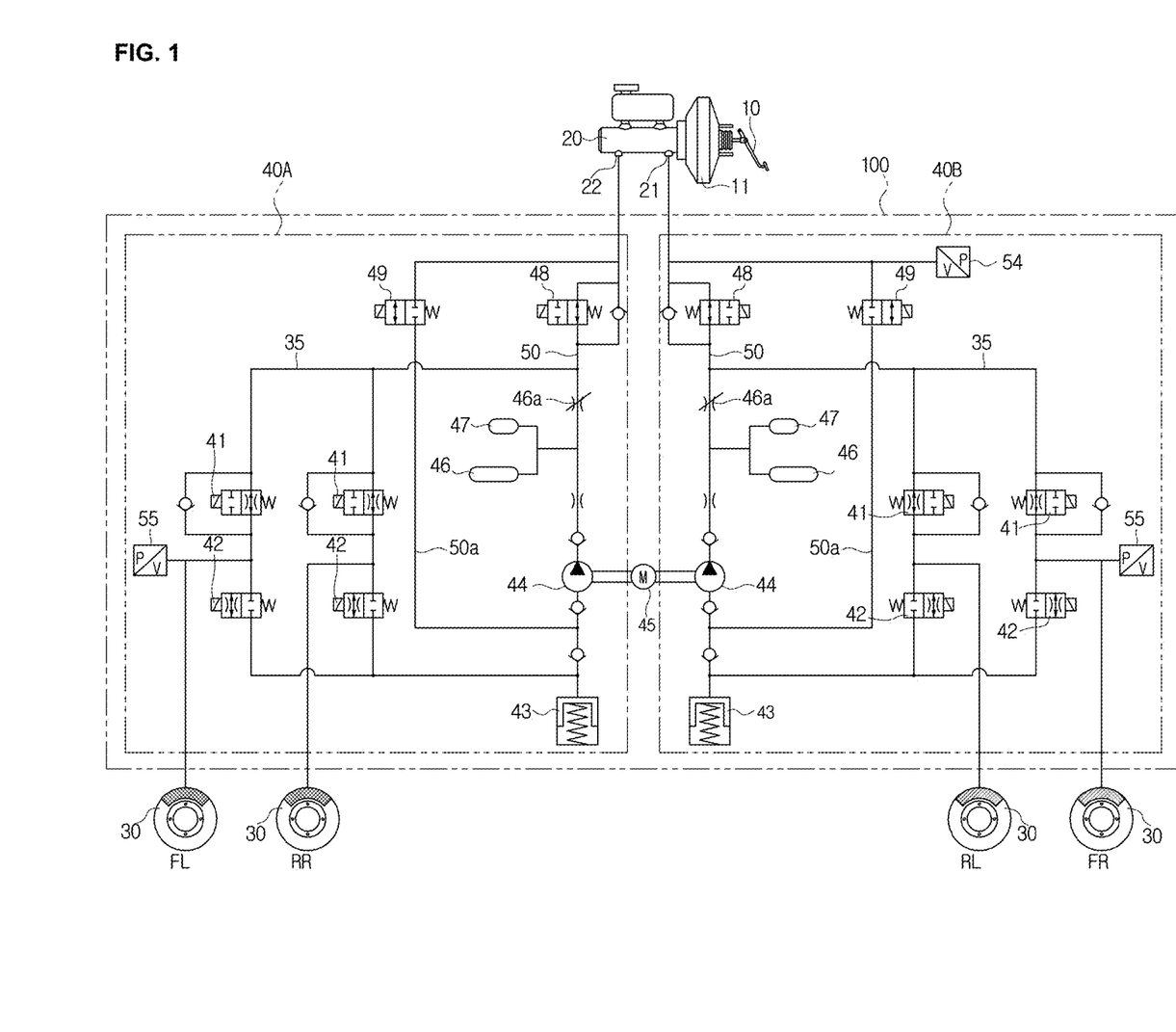
FIG. 1 is a hydraulic circuit diagram schematically illustrating an electronic brake system according to an aspect of the present disclosure.

FIG. 1 is a hydraulic circuit diagram schematically illustrating an electronic brake system according to an aspect of the present disclosure.

Referring to FIG. 1, the electronic brake system to which the present disclosure is applied includes a valve block 100 having hydraulic circuits 40A and 40B for controlling such that the braking hydraulic pressure generated through a booster 11 and a master cylinder 20 connected with a brake pedal 10 is transmitted to wheel cylinders 30 provided on respective wheels FL, FR, RL and RR. The hydraulic circuits 40A and 40B are formed as the first hydraulic circuit 40A for connecting a first port 21 of the master cylinder 20 and the wheel cylinders 30 provided on the two wheels FR and RL to control hydraulic pressure transmission, and the second hydraulic circuit 40B for connecting a second port 22 of the master cylinder 20 and the wheel cylinders 30 provided on the remaining two wheels FL and RR to control hydraulic pressure transmission. The first and second hydraulic circuits 40A and 40B are provided in the valve block 100 in a compact manner.

The respective hydraulic circuits 40A and 40B include a plurality of solenoid valves 41 and 42 for controlling braking hydraulic pressure transmitted to the two wheel cylinders 30, a low pressure accumulator 43 for temporarily storing the oil that has exited from the wheel cylinder 30 side, a pump 44 for pumping oil in the low pressure accumulator 43 or the master cylinder 20, a common motor 45 for driving the respective pumps 44, first and second pulsation reduction devices 46 and 47 having an orifice 46a disposed at an outlet side thereof to reduce the pressure pulsation of the oil discharged by the operation of the respective pumps 44, a driving force control valve 48 and a shuttle valve 49 for controlling the flow of oil, flow passages 50 and 50a for transmitting the hydraulic pressure discharged from the first and second pulsation reduction devices 46 and 47 or the fluid pressure generated from the master cylinder 20 selectively to suction sides of the wheel cylinders 30 or the pumps 44, and a port connection flow passage 35 branched from the flow passage 50 connecting the orifice 46a and the driving force control valve 48.

That is, as shown in the drawing, the plurality of solenoid valves 41 and 42, the low pressure accumulator 43, the pumps 44, the first and second pulsation reduction devices 46 and 47, the driving force control valve 48, the shuttle valve 49, the various flow passages 35, 50 and 50a, and the like are provided in the valve block 100 in a compact manner to constitute the first and second hydraulic circuits 40A and 40B.

More specifically, the plurality of solenoid valves 41 and 42 are constituted by the normally open type (NO type) solenoid valves 41 (hereinafter referred to as 'NO valve') which are connected to upstream sides of the wheel cylinders 30 and are maintained in a normally open state, and the normally closed type (NC type) solenoid valves 42 (hereinafter referred to as 'NC valve') which are connected to downstream sides of the wheel cylinders 30 and are maintained in a normally closed state. The opening and closing operations of the NO and NC valves 41 and 42 are controlled by an electronic control unit (not shown) that detects the vehicle speed through a wheel sensor (not shown) disposed on each of the wheels FL, FR, RL and RR, respectively.

Further, the bypass flow passage 50a is branched from the flow passage 50, which connects an outlet side of the master cylinder 20 to the first and second pulsation reduction devices 46 and 47 and the driving force control valve 48, and connected to an inlet side of the pump 44. The bypass flow passage 50a is provided with the shuttle valve (ESV) 49 that is normally closed and opens in response to an open signal. That is, the bypass passage 50a guides the oil in the master cylinder 20 to be sucked into the inlet of the pump 44 in accordance with the opening and closing operation of the shuttle valve 49.

Further, the driving force control valve (TC NO valve) 48 is provided on the hydraulic flow passage 50 between the outlet side of the master cylinder 20 and the orifice 46a formed on the outlet side of the first and second pulsation reduction devices 46. The driving force control valve 48 is switched from a normally opened state to a closed state when road surface slip of the wheels occurs due to sudden start or the like of the vehicle, so that the braking pressure generated by the driving of the pump 44 can be transmitted to the wheel cylinder 30 in each of the wheels FL, FR, RL and RR. Accordingly, even when the driver does not step on the brake pedal 10, the braking of the vehicle can be performed.

The port connection flow passage 35 is branched from the hydraulic flow passage 50 connecting a discharge end of the orifice 46a and the driving force control valve 48, and is connected to the wheel cylinder 30 of the respective wheels FL, FR, RL and RR via the NO valves 41 and the NC valves 42.

The pair of pumps 44 is driven while having a phase difference of 180 degrees by the motor 45 so that the oil in the low pressure accumulators 43 or the master cylinder 20 is pumped to the first and second pulsation reduction devices 46 and 47.

In the electronic brake system according to one aspect of the present disclosure, the first and second pulsation reduction devices 46 and 47 are provided in the valve block 100, but it is not limited thereto. For example, one pulsation reducing device 46 may be selectively provided, or the pulsation reducing device may not be provided. This is because the configuration of the flow passages are not changed irrespective of the presence or absence of the first and second pulsation reduction devices 46 and 47. Therefore, it is possible not only to improve the compatibility between products, but also to provide various product selections within the same size by preventing the size of the valve block from varying according to products.

A reference numeral '54', which is not described, is a cylinder pressure sensor provided for measuring the hydraulic pressure generated from the master cylinder 20. Further, a reference numeral '55' denotes a pair of wheel pressure sensors respectively provided on the two hydraulic circuits 40A and 40B to detect hydraulic pressure transmitted to the wheel cylinders 30.

The valve block provided in the electronic brake system as above will be described in more detail below with reference to FIGS. 2 to 5.

Figure 2:
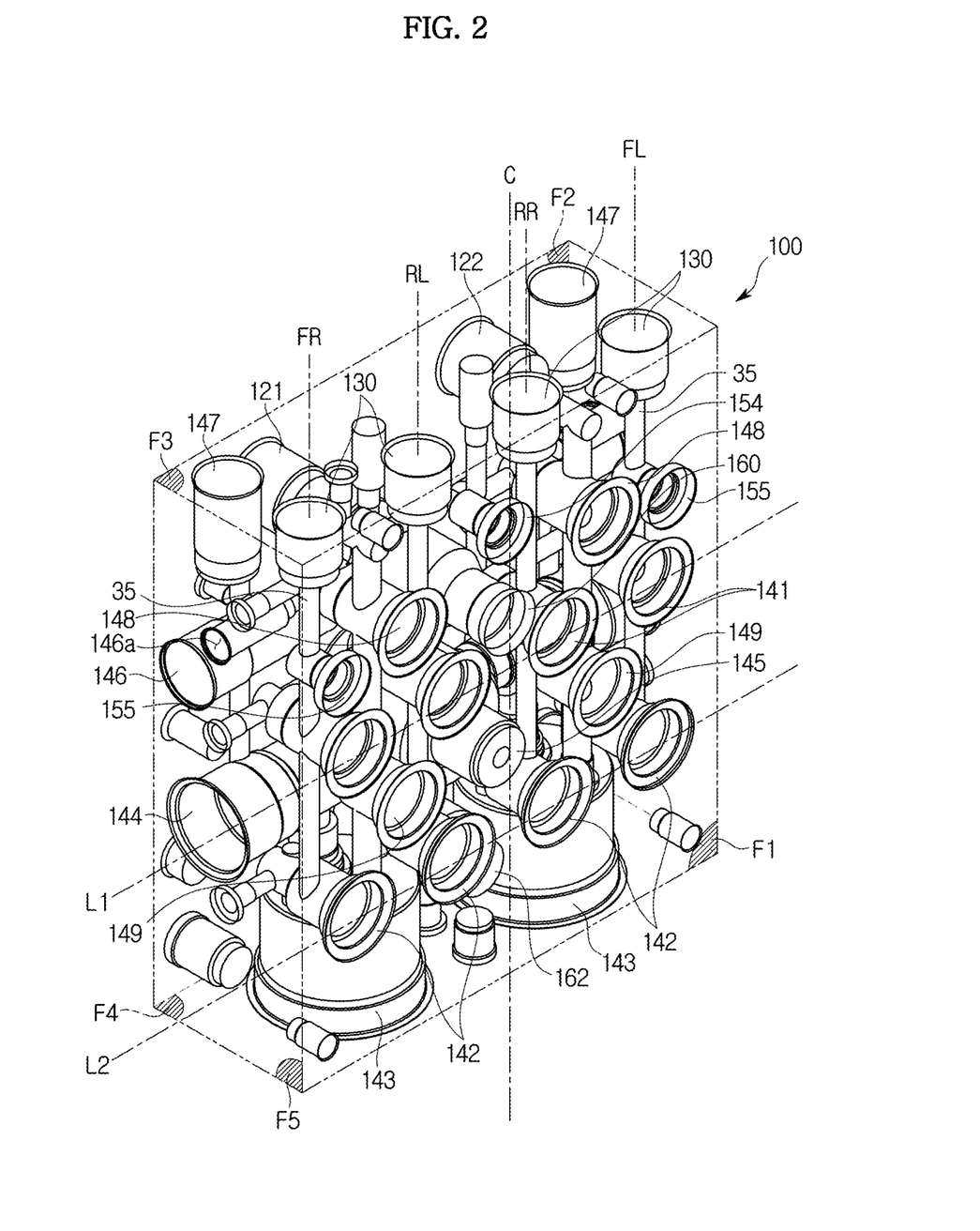
FIG. 2 is a perspective view illustrating a front side of a valve block for an electronic brake system according to an embodiment of the present disclosure.
Figure 3:
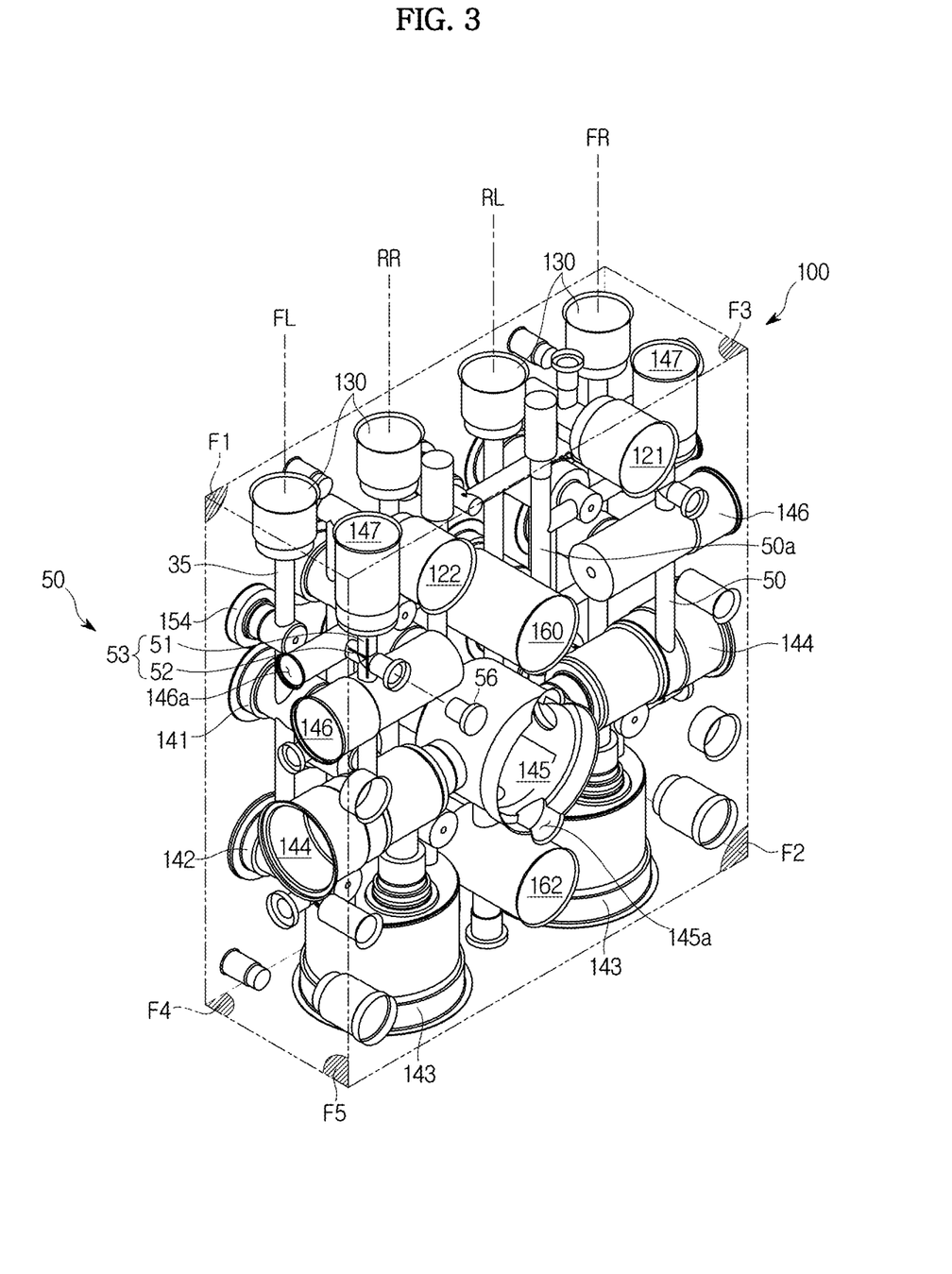
FIG. 3 is a perspective view illustrating a back side of the valve block illustrated in FIG. 2.
Figure 4:
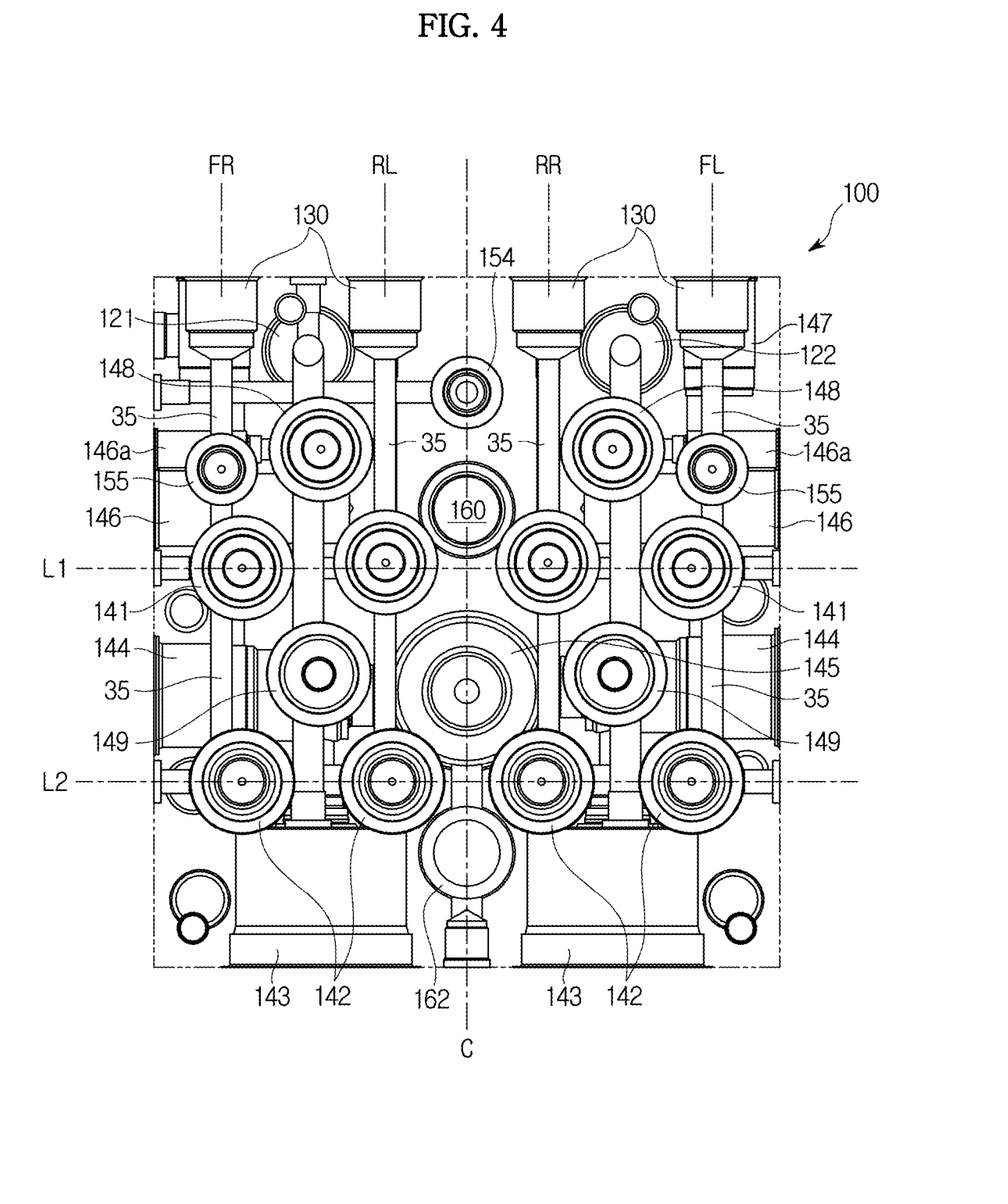
FIG. 4 is a plan view illustrating a front side of the valve block illustrated in FIG. 2.
Figure 5:
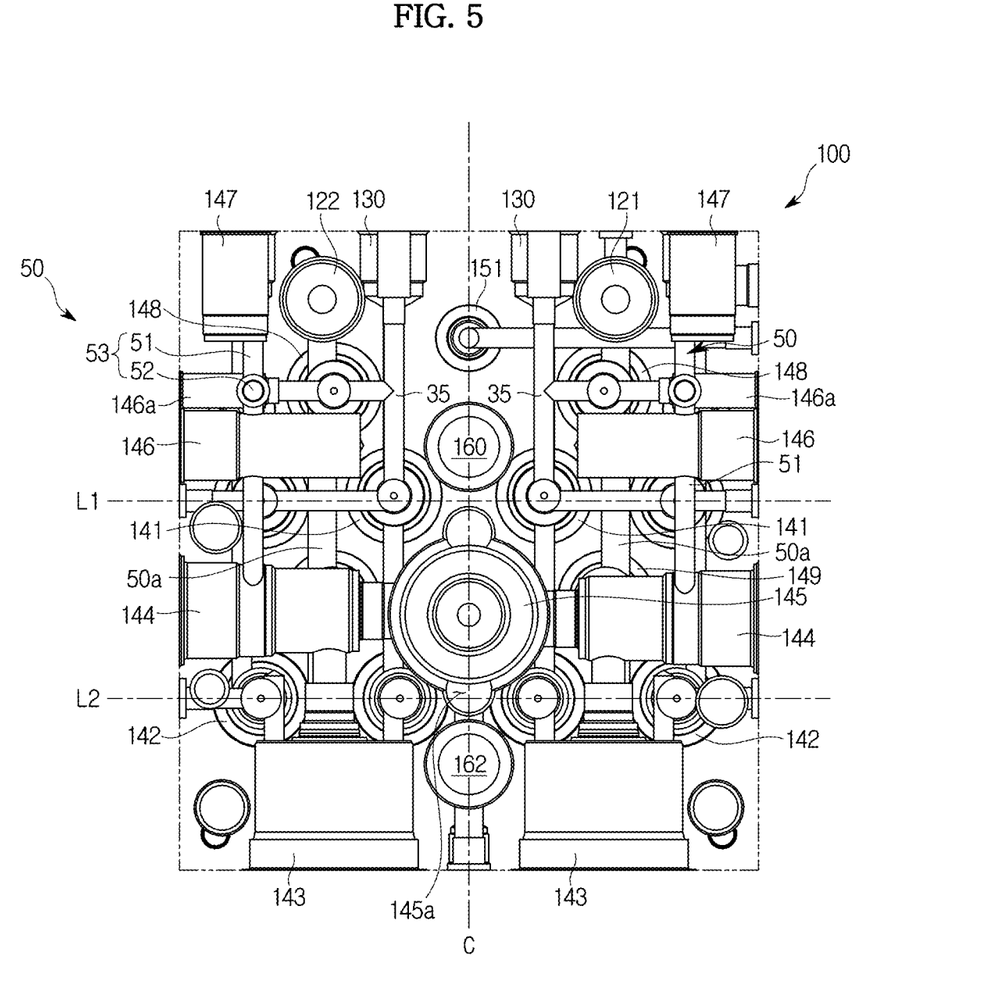
FIG. 5 is a plan view illustrating a back side of the valve block illustrated in FIG. 2.

FIG. 2 is a perspective view illustrating a front side of a valve block for an electronic brake system according to an embodiment of the present disclosure, FIG. 3 is a perspective view illustrating a back side of the valve block illustrated in FIG. 2, FIG. 4 is a plan view illustrating a front side of the valve block illustrated in FIG. 2, and FIG. 5 is a plan view illustrating a back side of the valve block illustrated in FIG. 2.

Although a front surface F1, a rear surface F2, an upper surface F3, a lower surface F4 and opposite side surfaces F5 which indicate the direction of the valve block 100 in order to facilitate understanding of the present disclosure are set on the basis of the valve block 100 shown in FIG. 2, it is not limited thereto, and it is to be understood that the surfaces which indicate the direction of the valve block 100 may be changed depending on the position where the valve block 100 is installed.

Referring to FIGS. 1 to 5, the valve block 100 has a rectangular parallelepiped shape. A plurality of accommodating bores 141, 142, 148, 149, 154, and 155, into which the NO valves 41, the NC valves 42, the driving force control valves 48, the shuttle valves 49 and the pressure sensors 54 and 55 are inserted, are formed on the front surface F1 of the valve block 100, respectively. Accommodating bores 145 and 160 into which the motor 45 and a motor connector (not shown) are inserted, and master cylinder connection ports 121 and 122 connected to the master cylinder 20 are formed on the rear surface F2 of the valve block 100. Wheel cylinder connection ports 130, and second damping bores 147 for accommodating the second pulsation reduction devices 47 are formed on the upper surface F3 of the valve block 100, and low pressure accumulator accommodating bores 143 for accommodating the low pressure accumulators 43 are formed on the lower surface F4 of the valve block 100. Further, pump accommodating bores 144 and first damping bores 146 for accommodating the pumps 44 and the first pulsation reduction devices 46 are formed on the opposite side surfaces F5 of the valve block 100.

Except for the components arranged on a center line C across the upper surface F3 and the lower surface F4 of the valve block 100 among the components provided in the valve block 100, the remaining components are symmetrically formed on the opposite side surfaces based on the center line C. That is, the two hydraulic circuits 40A and 40B are formed on both sides with respect to a center line. The arrangement structure of the components installed in the valve block 100 will be described in detail below.

More specifically, the plurality of NO valve accommodating bores 141 each accommodating the plurality of NO valves 41 are formed in a first valve row L1 on the front surface F1 of the valve block 100, and the plurality of NC valve accommodating bores 142 each accommodating the plurality of NC valves 42 are formed in a second valve row L2 on the front surface F1 of the valve block 100. The first and second valve rows L1 and L2 are formed in the lateral direction across the opposite side surfaces F5 of the valve block 100 and are arranged in parallel with each other. That is, the plurality of first and second valve accommodating bores 141 and 142 are each formed to open at the front surface F1 of the valve block 100 and arranged in the lateral direction.

The driving force control valve accommodating bores 148 for accommodating the driving force control valves 48 are formed at an upper side of the first valve row L1. The driving force control valve accommodating bores 148 are formed in a pair and are arranged to be opened on the front surface F1 of the valve block 100 and arranged transversely to be parallel to the first valve row L1. Further, the pair of driving force control valve accommodating bores 148 is symmetrically arranged on both sides with respect to the center line C of the valve block 100 and are provided with one on each of the two hydraulic circuits 40A and 40B.

The shuttle valve accommodating bores 149 for accommodating the shuttle valves 49 are formed between the first valve row L1 and the second valve row L2. The shuttle valve accommodating bores 149 are formed in a pair so as to be respectively formed on the two hydraulic circuits 40A and 40B. The pair of shuttle valve accommodating bores 149 is formed to be open at the front surface F1 of the valve block 100 and arranged transversely to be parallel to the first valve row L1. Further, the shuttle valve accommodating bores 149 are connected to suction sides of the pump accommodating bores 144 and the master cylinder connection ports 121 and 122.

The pressure sensor accommodating bores 154 and 155 in which the pressure sensors 54 and 55 are installed are constituted by the cylinder pressure sensor accommodating bore 154 provided to detect the hydraulic pressure of the master cylinder 20 and the wheel pressure sensor accommodating bores 155 provided to detect the hydraulic pressure of the wheel cylinders 30.

The cylinder pressure sensor accommodating bore 154 is formed on the center line C defining the two hydraulic circuits 40A and 40B. As shown in the drawing, the cylinder pressure sensor accommodating bore 154 is formed to be positioned above the valve row on which the pair of driving force control valve accommodating bores 148 is arranged, that is, above the motor connector accommodating bore 160, which will be described later. The cylinder pressure sensor accommodating bore 154 is shown as being connected to the master cylinder connection port 121 connected to the first port 21 of the master cylinder 20, but it is not limited thereto. For example, the cylinder pressure sensor accommodating bore 154 may be connected to the master cylinder connection port 122 connected to the second port 22 by changing the position of the flow passages.

The wheel pressure sensor accommodating bores 155 are formed between the first valve row L1 and the pair of driving force control valve accommodating bores 148 and are formed in a pair so as to be respectively provided on the two hydraulic circuits 40A and 40B. That is, the respective wheel pressure sensor accommodating bores 155 are arranged to have a triangular configuration together with the respective outermost NO valve accommodating bores 141 of the first valve row L1 and the respective driving force control valve accommodating bores 148. Each of the wheel pressure sensor accommodating bores 155 is connected to the port connection flow passage 35 connecting the wheel cylinder connection ports 130 and the NO valve accommodating bores 141 to detect the hydraulic pressure of the wheel cylinders 30. The port connection flow passage 35 which connects the wheel cylinder connection ports 130 and the NO valve accommodating bores 141 is not a separately machined flow passage for connection with the wheel pressure sensor accommodating bores 155 but an essential flow passage for transmitting hydraulic pressure to the wheel cylinder connection ports 130. That is, the port connection flow passages 35 are provided to be connected to the wheel cylinder connection ports 130 which are connected to the wheels FL and RR or FR and RL, and to be connected to the NO valve accommodating bores 141 and the NC valve accommodating bores 142. Since it is possible to exclude the process of extending the flow passages or machining separate flow passages by machining only the wheel pressure sensor accommodating bores 155 so that the wheel pressure sensor accommodating bores 155 are connected to the port connection flow passages 35, not only is the machining time reduced but also the ease of machining is improved.

Although the pair of wheel pressure sensor accommodating bores 155 is shown as being connected to the wheel cylinder connection ports 130 connected to the front wheels FL and FR, it is not limited thereto. For example, the pair of wheel pressure sensor accommodating bores 155 may be selectively connected to the wheel cylinder connection ports 130 connected to the rear wheels RL and RR or the wheel cylinder connection ports 130 connected to the right front wheel FR and the right rear wheel RR. That is, in the structure in which the pair of wheel pressure sensor accommodating bores 155 is arranged in the lateral direction, it may be implemented by changing the formation position of the wheel pressure sensor accommodating bores 155 in the lateral direction in which the wheel pressure sensor accommodating bores 155 are arranged. Even if the position of the wheel pressure sensor accommodating bores 155 is changed as described above, it is not necessary to machine separate passages for connection with the wheel pressure sensor accommodating bores 155 by being connected to the existing port connection flow passage 35 connecting the wheel cylinder connection ports 130 and the NO valve accommodating bores 141.

As described above, since the wheel pressure sensor accommodating bores 155 are formed without interference with peripheral components, it is possible to arrange the components compactly without increasing the size of the valve block 100.

On the rear surface F2 of the valve block 100, the motor accommodating bore 145 in which the motor 45 is installed is formed. The motor accommodating bore 145 is formed on the center line C of the valve block 100 and is disposed between the first valve row L1 and the second valve row L2. As shown in the drawing, the motor accommodating bore 145 is formed between the pair of shuttle valve accommodating bores 149 arranged between the first valve row L1 and the second valve row L2. The motor accommodating bore 145 is formed to be perpendicular to the pump accommodating bores 144 between the pair of pump accommodating bores 144, which will be described later.

The motor connector accommodating bore 160 is provided on the rear surface F2 of the valve block 100 for electrical connection with the motor 45 mounted on the motor accommodating bore 145. The motor connector accommodating bore 160 is formed on the motor accommodating bore 145 on the center line C of the valve block 100. The motor connector accommodating bore 160 is disposed between the first valve row L1 and the driving force control valve accommodating bore 148 and is formed to pass through the valve block 100.

A leakage bore 162 may be formed on the rear surface F2 of the valve block 100. The leakage bore 162 is connected to the motor accommodating bore 145 on the center line C of the valve block 100 and disposed below the second valve row L2. As shown in the drawing, the leakage bore 162 is formed between the pair of low pressure accumulator accommodating bores 143, which will be described later. That is, the leakage bore 162 is formed in a gap between the pair of low pressure accumulator accommodating bores 143. The leakage bore 162 allows oil to flow in as the oil leaking through the pump accommodating bores 144 passes into the motor accommodating bore 145. The leakage bore 162 is formed as a blind bore by a sealant which is applied to the back surface during the assembly of the motor and adhered thereto. This ensures the immersion leakage prevention and leakage stability of the hydraulic system.

The cylinder pressure sensor accommodating bores 154, the motor connector accommodating bore 160, the motor accommodating bore 145 and the leakage bore 162, which are described as above, are formed by being sequentially arranged on the center line C in the direction from the upper surface F3 to the lower surface F4 of the valve block 100.

At least one motor vent hole 145a may be formed in the motor accommodating bore 145. The motor vent hole 145a is formed to reduce the temperature difference between the motor 45 and the valve block 100 and serves to prevent the leaking oil from flowing into the motor 45. For example, the temperature of the motor 45 increases in the operation of an electronic brake system, while the valve block 100 has a relatively lower temperature than the motor 45. When the operation is stopped in this state and the temperature of the motor 45 is lowered, the leaked oil is sucked to the motor 45 side as the expanded air is contracted. Therefore, it is possible to prevent the leaked oil from being sucked into the motor 45 due to the contracted air by reducing the temperature difference between the contact portions of the motor 45 and the valve block 100 by forming the motor vent hole 145a. Thus, the leaked oil that is not sucked into the motor 45 easily flows into the leakage bore 162.

The pair of master cylinder connection ports 121 and 122 for receiving braking hydraulic pressure through the first and second ports 21 and 22 of the master cylinder 20 is provided on the rear surface F2 of the valve block 100. That is, the pair of master cylinder connection ports 121 and 122 is formed to be close to the upper surface F3 of the valve block 100 and to open at the rear surface F2 of the valve block 100. The pair of master cylinder connection ports 121 and 122 is formed by being arranged in the lateral direction which is the opposite side direction of the valve block 100. Further, the pair of master cylinder connection ports 121 and 122 is symmetrically arranged on both sides with respect to the center line C of the valve block 100 and are provided with one on each of the two hydraulic circuits 40A and 40B.

The pair of low pressure accumulator accommodating bores 143 is formed on the lower surface F4 of the valve block 100 in the lateral direction.

The plurality of wheel cylinder connection ports 130 for transmitting the braking hydraulic pressure to the wheel cylinders 30 of the respective wheels FL, FR, RL and RR are formed on the upper surface F3 of the valve block 100. The wheel cylinder connection ports 130 are formed so as to be disposed close to the front surface F1 of the valve block 100. The pair of second damping bores 147 is formed on the upper surface F3 of the valve block 100. The second damping bores 147 are machined in the direction of the lower surface F4 of the valve block 100 and are arranged to be close to the rear surface F2 and the opposite side surfaces F5 of the valve block 100. That is, the second damping bores 147 are formed between the master cylinder connection ports 121 and 122 and the opposite side surfaces F5 of the valve block 100. The second damping bores 147 are formed to damp the pressure pulsation due to the hydraulic pressure discharged from the pumps 44 together with the first damping bores 146. The connection structure of the second damping bores 147, the first damping bores 146, and the pump accommodating bores 144 will be described below.

On the opposite side surfaces F5 of the valve block 100 are provided the pump accommodating bores 144 in which the pumps 44 are accommodated. The pump accommodating bores 144 are formed in the horizontal direction between the first valve row L1 and the second valve row L2. That is, the pump accommodating bores 144 are formed so as to be parallel to the first and second valve rows L1 and L2 on the opposite side surfaces F5 of the valve block 100. The pump accommodating bores 144 are formed to be symmetrical on both sides with respect to the motor accommodating bore 145.

On the opposite side surfaces F5 of the valve block 100, the first damping bores 146, in which the first pulsation reduction devices 46 are installed, are formed. The first damping bores 146 are formed above the pump accommodating bores 144 to have an arrangement parallel to the pump accommodating bores 144. Specifically, the first damping bores 146 are disposed between the first valve row L1 and the driving force control valve accommodating bores 148.

On the opposite side surfaces F5 of the valve block 100, the orifice bores 146a are formed in which the orifices 46a are provided. The respective orifice bores 146a are disposed between the respective first damping bores 146 and the respective second damping bores 147 and have an arrangement parallel to the first damping bores 146. The orifice bores 146a are connected to the first and second damping bores 146 and 147 and are connected to the driving force control valve accommodating bores 148.

The pump accommodating bores 144, the first damping bores 146, the second damping bores 147, and the orifice bores 146a as described above are connected by the hydraulic flow passages 50. More specifically, first hydraulic lines 51 are formed in a straight line in the direction of the lower surface F4 of the valve block 100 from the bottom surface of the second damping bores 147. The first hydraulic lines 51 connect the discharge side of the pump accommodating bores 144, the suction side of the first damping bores 146, the discharge side of the first damping bores 146, and the bottom surface of the second damping bores 147. Further, second hydraulic lines 52 orthogonal to the first hydraulic lines 51 are formed on the rear surface F2 of the valve block 100 to connect the first hydraulic lines 51 and the orifice bores 146a. An opening of the respective second hydraulic lines 52 is closed by a closing member 56 so that the second hydraulic lines 52 prevent leakage of oil to the rear surface F2 of the valve block 100. Accordingly, the second hydraulic lines 52 connecting the first hydraulic lines 51 and the orifice bores 146a are formed as third hydraulic lines 53 having a T shape. That is, the respective orifices 46a are provided at the outlet side of the respective orifice bores 146a connected through the respective third hydraulic lines 53, and the respective orifice bores 146a are connected to the respective driving force control valve accommodating bores 148. Accordingly, the hydraulic pressure discharged from the pump accommodating bores 144 is momentarily confined between the first damping bores 146 and the second damping bores 147, and then divided by the T-shaped third hydraulic lines 53 so that a pulsation reducing effect is exerted by the first damping bores 146 and the second damping bores 147. At this time, due to the first damping bores 146 allowing flow, the reduced flow of pulsation passes through the orifices 46a, further enhancing the pulsation damping effect.

Figure 6:
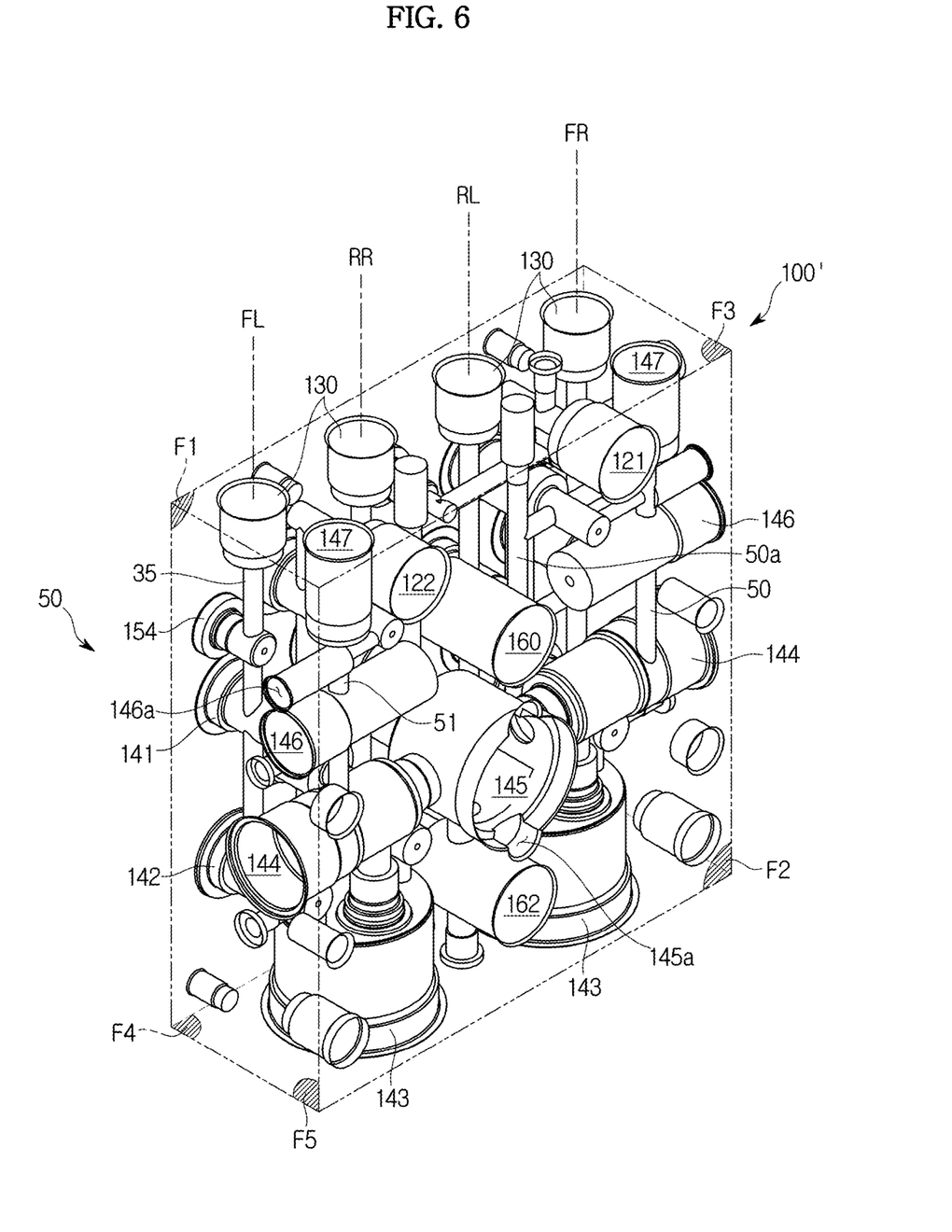
FIG. 6 is a perspective view illustrating a front side of a valve block for an electronic brake system according to another embodiment of the present disclosure.
Figure 7:
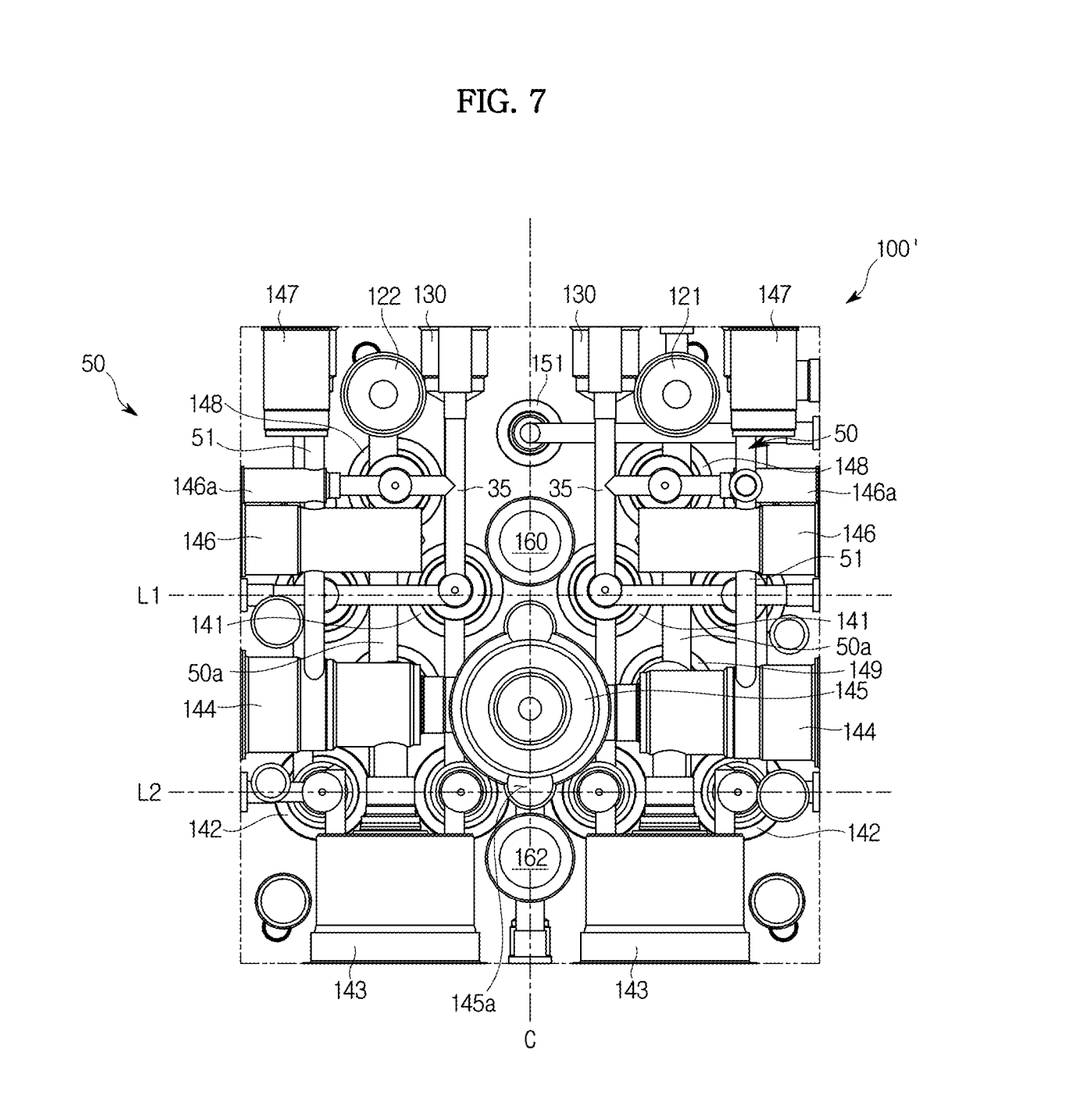
FIG. 7 is a plan view illustrating a back side of the valve block illustrated in FIG. 6.

Although the orifice bores 146a are shown and described as being connected through the second hydraulic lines 52, it is not limited thereto. For example, the orifice bores 146a may be directly connected to the first hydraulic lines 51. Such an embodiment is shown in FIGS. 6 and 7. FIG. 6 is a perspective view illustrating a front side of a valve block for an electronic brake system according to another embodiment of the present disclosure, and FIG. 7 is a plan view illustrating a back side of the valve block illustrated in FIG. 6. Herein, the same reference numerals as in the drawings shown above indicate members having the same function.

Referring to FIGS. 6 and 7, on the opposite side surfaces F5 of a valve block 100' according to the present embodiment, the orifice bores 146a in which the orifices 46a are installed are disposed between the first damping bores 146 and the second damping bores 147 and are formed to have an arrangement parallel to the first damping bores 146. More specifically, the respective orifice bores 146a are directly connected to the respective first hydraulic lines 51 which connect the discharge side of the pump accommodating bores 144, the suction side of the first damping bores 146, the discharge side of the first damping bores 146, and the bottom side of the second damping bores 147 on the opposite side surfaces F5 of the valve block 100'. That is, the orifice bores 146a are formed at the position where the first hydraulic lines 51 are formed. Further, the orifice bores 146a are connected not only to the first and second damping bores 146 and 147 through the first hydraulic lines 51, but are also machined to extend to the driving force control valve accommodating bores 148 so as to be connected to the driving force control valve accommodating bores 148.

As described above, even if the orifice bores 146a are directly connected to the first hydraulic lines 51, as in the previous embodiment, the hydraulic pressure discharged from the pump accommodating bores 144 is momentarily confined between the first damping bores 146 and the second damping bores 147, and a pulsation reducing effect is exerted by the first damping bores 146 and the second damping bores 147. In addition, the flow of reduced pulsation passes through the orifices 46a, doubling the pulsation damping effect.

The first and second damping bores 146 and 147 provided in the valve blocks 100 and 100' are elements added by a user's choice, but the valve blocks 100 and 100' that do not use the first and second damping bores 146 and 147 may be provided.

As is apparent from the above, the valve block for an electronic brake system according to an embodiment of the present disclosure has effects that the arrangement structure of the components installed for the control of the hydraulic flow can be improved, and the size of the valve block can be prevented from increasing and the manufacturing cost of the valve block can be reduced by utilizing the space between the components.

Further, the valve block for an electronic brake system according to an embodiment of the present disclosure has an advantage that it is possible to allow the same flow passages to be implemented irrespective of the presence or absence of the pulsation reduction device (first damping bore) and the additional damping device (the second damping bore), thereby improving the compatibility between the products. This has the effect of making it possible to select various products within the same size by preventing the size variation of the valve block.

Further, the valve block for an electronic brake system according to an embodiment of the present disclosure has effects that not only the machining time of the accommodating bores for installing the wheel bore sensors is reduced, but also the ease of machining is improved because the machining of separate flow passages for connection with the wheel pressure sensors is not required by installing the wheel pressure sensors in the flow passages formed in the valve block.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A valve block for an electronic brake system which comprises two hydraulic circuits, a plurality of accommodating bores in which valves, pumps, low pressure accumulators, pressure sensors, and a motor are installed in order to control the braking hydraulic pressure supplied from a master cylinder to a wheel cylinder installed in each wheel, and a plurality of flow passages for connecting the plurality of accommodating bores,
    wherein on opposite side surfaces of the valve block, pump accommodating bores are formed symmetrically to each other to accommodate the pump, and first damping bores having an arrangement parallel to the pump accommodating bores are formed above the pump accommodating bores,
    wherein on an upper surface of the valve block, a pair of second damping bores is formed so as to be positioned above the first damping bores, and
    wherein first hydraulic lines are formed in a straight line from a bottom surface of the pair of second damping bores toward a bottom surface of the valve block, so that a discharge side of the pump accommodating bores and a suction side of the first damping bores, and a discharge side of the second damping bores and the bottom surface of the second damping bores are connected by the first hydraulic lines,
    wherein on the opposite side surfaces of the valve block, orifice bores are formed, and
    wherein on a rear surface of the valve block, second hydraulic lines perpendicular to the first hydraulic lines are formed so that the respective first hydraulic lines and the respective orifice bores are connected.

2. The valve block for an electronic brake system according to claim 1, wherein the orifice bores are symmetrically with each other so as to have an arrangement parallel to the first damping bores between the first damping bores and the second damping bores.

3. The valve block for an electronic brake system according to claim 2, wherein the respective orifice bores are directly connected to the respective first hydraulic lines.

4. The valve block for an electronic brake system according to claim 2,
    wherein accommodating bores in which normally open (NO) valves, normally closed (NC) valves, driving force control valves, shuttle valves, and pressure sensors are installed are formed on a front surface of the valve block,
    wherein on a rear surface of the valve block, receiving bores in which a motor and a motor connector are installed and master cylinder connection ports connected to the master cylinder are formed,
    wherein on a lower surface of the valve block, a pair of low pressure accumulator accommodating bores is formed, and
    wherein on the upper surface of the valve block, wheel cylinder connection ports are formed.

5. The valve block for an electronic brake system according to claim 4,
    wherein on the front surface of the valve block, the accommodating bores for the plurality of NO valves are arranged in a first valve row, and the accommodating bores for the plurality of NC valves are arranged in a second valve row,
    wherein the accommodating bores for the driving force control valves are formed above the first valve row so as to have an arrangement parallel to the first valve row, and
    wherein the accommodating bores for the shuttle valves are formed between the first valve row and the second valve row so as to have an arrangement parallel to the first and second valve rows.

6. The valve block for an electronic brake system according to claim 5,
    wherein the pump accommodating bores are formed to be disposed between the first valve row and the second valve row.

7. The valve block for an electronic brake system according to claim 5,
    wherein the first damping bores are formed between the first valve row and a valve row in which a pair of driving force control valves is formed.

8. The valve block for an electronic brake system according to claim 4,
    wherein the receiving bore for the motor is arranged between the pair of pump accommodating bores, and the receiving bore for the motor connector is arranged above the receiving bore for the motor, and
    wherein the receiving bore for the motor and the receiving bore for the motor connector are arranged on a center line based on the center line across the upper and lower surfaces of the valve block.

9. The valve block for an electronic brake system according to claim 4,
    wherein leakage bores are further formed so as to be arranged between the pair of low pressure accumulator accommodating bores.

10. The valve block for an electronic brake system according to claim 9,
    wherein the leakage bores are formed on the rear surface of the valve block.

11. The valve block for an electronic brake system according to claim 4,
    wherein the master cylinder connection ports are arranged in a pair so as to be respectively provided in the two hydraulic circuits, and
    wherein the second damping bores are formed between the pair of master cylinder connection ports and each side surface of the valve block.

12. The valve block for an electronic brake system according to claim 2,
    wherein the orifice bores are formed on both sides of the valve block so as to be parallel to a valve row in which a pair of driving force control valve accommodating bores is formed, and the outlets of the orifice bores are connected to the driving force control valve accommodating bores.

13. The valve block for an electronic brake system according to claim 1,
    further comprising closing members to close the second hydraulic lines formed on the rear surface of the valve block from the outside, wherein as the respective second hydraulic lines are closed from the outside by the respective closing members, the respective second hydraulic lines that connect the respective first hydraulic lines which are formed between the respective first damping bores and the respective second damping bores, and the respective orifice bores are formed by third hydraulic lines having a T shape.

14. A valve block for an electronic brake system which comprises two hydraulic circuits, a plurality of accommodating bores in which valves, pumps, low pressure accumulators, pressure sensors, and a motor are installed in order to control the braking hydraulic pressure supplied from a master cylinder to a wheel cylinder installed in each wheel, and a plurality of flow passages for connecting the plurality of accommodating bores, wherein on opposite side surfaces of the valve block, pump accommodating bores are formed symmetrically to each other to accommodate the pump, and first damping bores having an arrangement parallel to the pump accommodating bores are formed above the pump accommodating bores, wherein on an upper surface of the valve block, a pair of second damping bores is formed so as to be positioned above the first damping bores, and wherein first hydraulic lines are formed in a straight line from a bottom surface of the pair of second damping bores toward a bottom surface of the valve block, so that a discharge side of the pump accommodating bores and a suction side of the first damping bores, and a discharge side of the second damping bores and the bottom surface of the second damping bores are connected by the first hydraulic lines wherein pressure sensor accommodating bores in which the pressure sensors are installed are formed on a front surface of the valve block, and include a cylinder pressure sensor accommodating bore to detect the hydraulic pressure of the master cylinder and wheel pressure sensor accommodating bores to detect the hydraulic pressure of the wheel cylinders.

15. The valve block for an electronic brake system according to claim 14, wherein the cylinder pressure sensor accommodating bore is formed on a center line based on the center line dividing the two hydraulic circuits to be connected through a flow passage to any one of the pair of cylinder connection ports connected to the master cylinder, and is formed above the pair of driving force control valve accommodating bores.

16. The valve block for an electronic brake system according to claim 14, wherein the wheel pressure sensor accommodating bores are respectively provided in the two hydraulic circuits and are formed between the first valve row and the pair of driving force control valve accommodating bores.

17. The valve block for an electronic brake system according to claim 16, wherein the wheel pressure sensor accommodating bores are formed to be connected to port connection flow passages connecting the wheel cylinder connection ports and the NO valve accommodating bores.

18. A valve block for an electronic brake system which comprises two hydraulic circuits, a plurality of accommodating bores in which valves, pumps, low pressure accumulators, pressure sensors, and a motor are installed in order to control the braking hydraulic pressure supplied from a master cylinder to a wheel cylinder installed in each wheel, and a plurality of flow passages for connecting the plurality of accommodating bores, wherein a motor accommodating bore in which the motor is installed is formed on one side surface of the valve block, and at least one motor vent hole is formed in the motor accommodating bore.

19. The valve block for an electronic brake system according to claim 18, wherein the motor accommodating bore and the motor vent hole are arranged on a center line based on the center line across an upper surface and a lower surface of the valve block, and wherein on one surface of the valve block, a leakage bore is formed to abut the motor vent hole at the center line.

* * * * *